ATSUSHI OWADA,
SHINICHI SHIBATA, &
HIDEO MORI,
INVENTORS by Stephen H. Frishauf
Atty

SEMICONDUCTIVE TRANSDUCER

Filed Dec. 16, 1966

(A)-for prior art devices
(B)-for devices of present invention

United States Patent Office 3,512,054

Patented May 12, 1970

3,512,054

SEMICONDUCTIVE TRANSDUCER

Atsushi Owada, Yokohama-shi, Shinichi Shibata, Tokyo, and Hideo Mori, Yokohama-shi, Japan, assignors to Tokyo Shibaura Electric Co., Ltd., Kawasaki-shi, Japan, a corporation of Japan Filed Dec. 16, 1966, Ser. No. 602,303
Claims priority, application Japan, Dec. 21, 1965, 40/78,229; Apr. 9, 1966, 41/32,148; Aug. 31, 1966, 41/56,979
Int. Cl. H01l *11/06*
U.S. Cl. 317—235 9 Claims A semiconductor transducer includes a planar transistor having a raised portion thereon and a stress applicator located on the upper surface of the raised portion, the contact area of the stress applicator being larger than the area of the upper surface area of the raised portion. An emitter region is so disposed in said raised portion as to extend along the external surface thereof.

Figure 1:
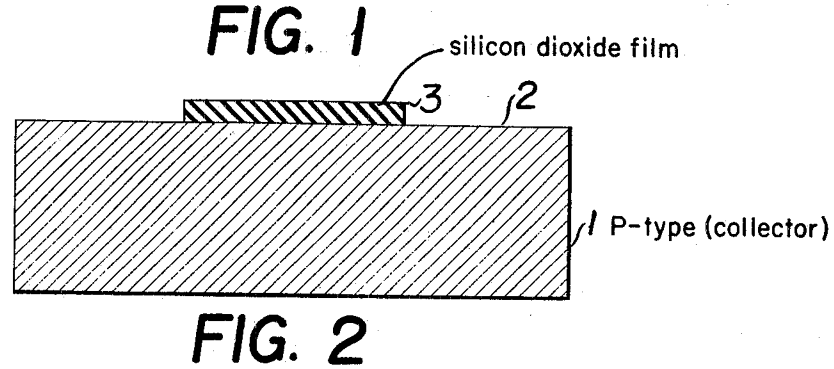

The present invention relates to semiconductive transducers for converting mechanical stress into an electrical quantity and methods of fabricating the same, said semiconductive transducers utilizing a semiconductor device.

It is well known that a mechanical stress applied across P-N junction of a semiconductor device comprising a semiconductive material such as silicon and germanium changes the electrical properties of the junction. This phenomenon is presently being utilized for such devices as microphones and strain gages. Transistor type transducers are known in the art and described, for instance, in Japanese patent publications Nos. 20,901/65 and 23,452/65. Transistor type transducers are constructed such that when a stress is applied across the emitter base junction, an electrical signal corresponding to the applied stress is generated and fed out through the collector circuit of the transistor. On the prior art devices the stress is applied on the emitter region of the transistor by a needle-like stress applicator made of a hard material as sapphire and having a tip contact area of the order of 10 microns in diameter, said needle-like stress applicator contacting the emitter region which is about 100 microns in diameter.

As the needle-like stress applicator of the prior art devices is usually made of a material, for instance sapphire, which is harder than the associated semiconductive material, making finer the tip of the stress applicator in order to increase the sensitivity would eventually produce damage in the body of the semiconductive material when a comparatively heavy load is applied thereto, thereby making the device useless. To make the stress applicator from a material softer than the semiconductive material such as tungsten, iron and the like for the sole purpose of preventing the occurrence of the damage in the semiconductive body, however, is undesirable because the tip of a stress applicator made of such soft material will undergo a deformation when the load W is applied, resulting in an expansion of the contact area, thereby greatly lowering the sensitivity of the device.

Though it is desirable to make smaller the emitter junction area for the purpose of increasing the sensitivity while keeping the contact area sufficiently small, the realization of a strict precision process for producing a planar type transistor transducer having extremely small parts of the order of 10 microns to obtain the desired results are practically impossible.

An object of this invention is to provide a transistor type transducer for converting mechanical stress into electrical quantity and the method for fabricating the same, said transducer having an improved sensitivity.

Another object of this invention is to provide a semiconductive transducer which is rugged and free from occurrence of the deteriorating damage in the body of the semiconductive material during its operation and the method for fabricating the same.

Figure 2:
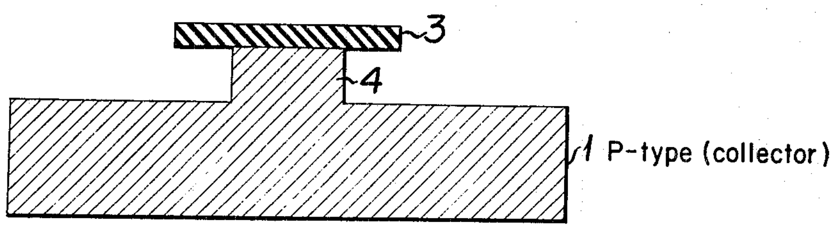
Figure 3:
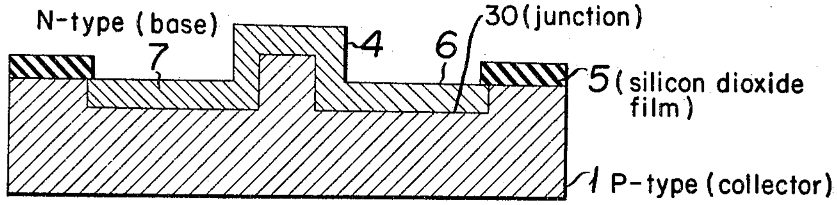
Figure 4:
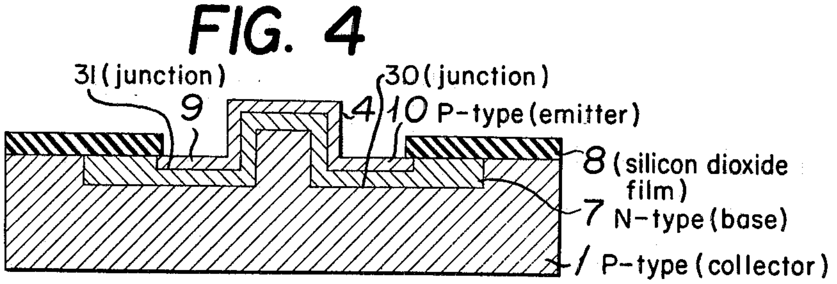
Figure 5:
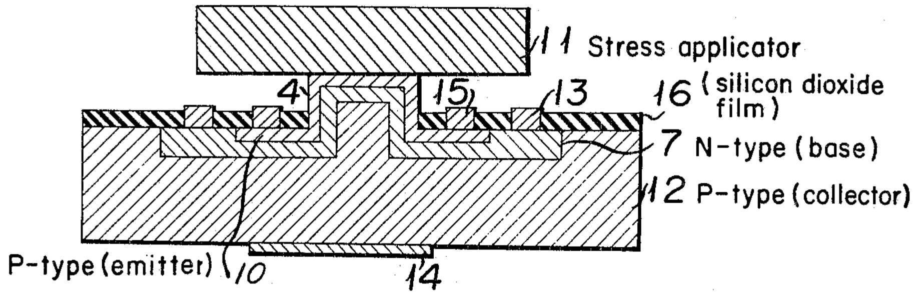
Figures 6, 7:
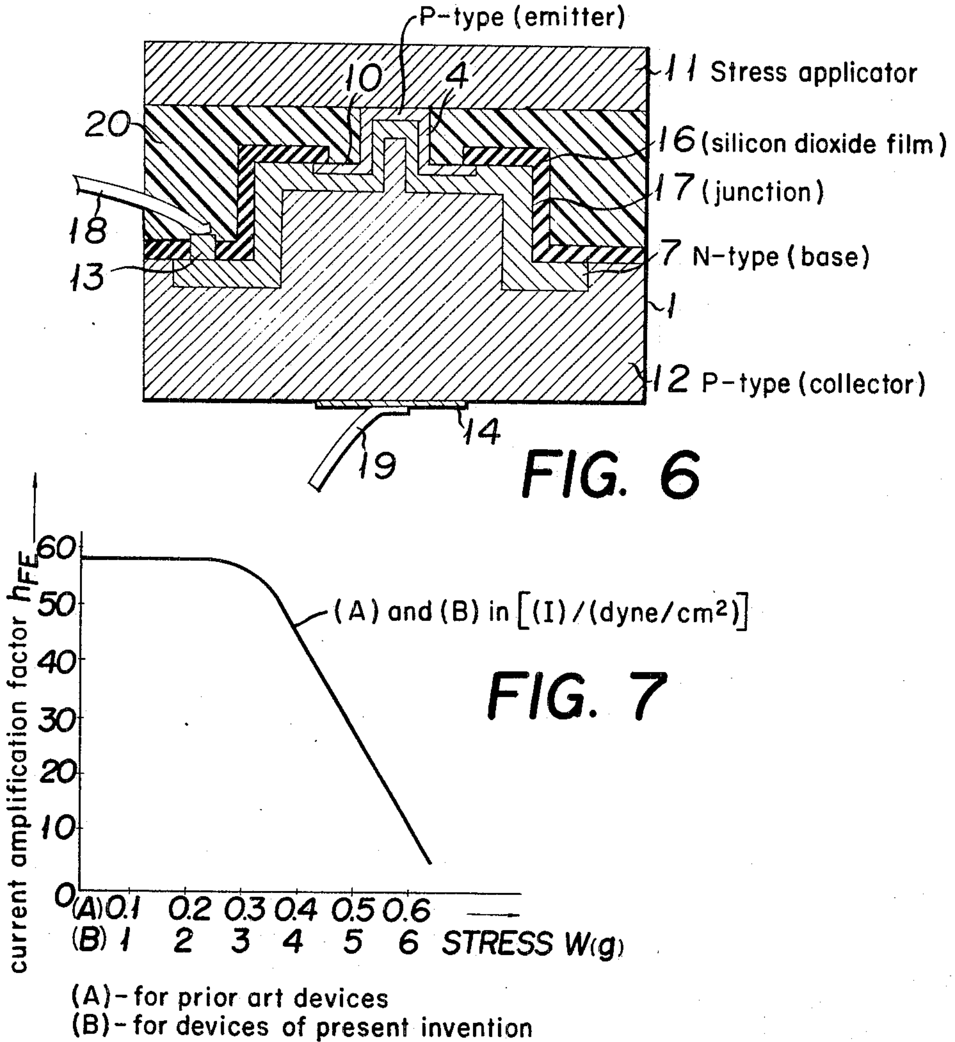

These and other objects of the invention will become more clearly apparent from the following description taken in conjunction with the accompanying drawings, in which:

FIGS. 1 to 5 are sectional views of successive stages in the fabrication of one embodiment of the semiconductive transducer according to the invention wherein FIG. 1 shows a single-crystal silicon wafer on part of which a silicon dioxide film is deposited, FIG. 2 shows the wafer which is etched in a vertical and lateral direction by using an etching solution to form a raised portion thereon. FIG. 3 shows the wafer having a base region formed by selective diffusion, FIG. 4 shows the wafer having an emitter region formed by a suitable diffusion process, and FIG. 5 shows a finished device having a stress applicator disposed on the raised portion of the wafer;

FIG. 6 is a sectional view illustrating another embodiment of the semiconductive transducer according to the invention; and FIG. 7 is a graph comparing the characteristics of the transducer according to the invention with those of a conventional transducer.

In one exemplary embodiment of the invention, one starts with a single-crystal silicon wafer 1 of P-type conductivity, as shown in FIG. 1, the central portion of the upper surface 2 thereby being covered with a circular silicon dioxide film 3 of 6000 angstroms thick and 20 microns in diameter. The oxide film 3 may be formed by a high-temperature oxidation process carried out in a steam or oxygen atmosphere. A photoetching process may be used for leaving the circular portion of the silicon dioxide film 3 at the center of the surface 2 while removing the rest of the film.

The side of the wafer 1 partially masked with the oxide film 3 is then dipped in a mixed solution containing 48% hydrofluoric acid and 62% nitric acid in a ratio of 2:50 to etch the unmasked portion located on the dipped side of the silicon wafer 1 to a depth of 5 microns from the original surface and those parts of the masked portion which are disposed on the periphery of said unmasked portion and similarly located on said dipped side to a depth of 5 microns in a horizontal direction from the inner side of the previously etched portion. A raised portion which is 5 microns high and 10 microns in diameter is thus formed, directly beneath the flat circular silicon dioxide film 3. It is to be noted that also the original diameter of the silicon dioxide film 3 is 20 microns and that the obtained raised portion 4 is only 10 microns in diameter because of the lateral etching effect. The cross-sectional shape of the raised portion 3 is not limited to a circle, and any other convenient shape, for instance a square, may suffice as well.

The silicon dioxide film 3 remaining over the raised portion 4 is then removed as shown in FIG. 3. The removal of the film 3 may be done by means of an etching liquid such as hydrogen fluoride whose corrosive speed with respect to silicon dioxide is far greater than with respect to silicon. A second silicon dioxide film 5 is formed on that side of the silicon wafer 1 which contains the raised portion 4 in the same way as in the previous step. The film thus formed is further photoetched to form a first circular aperture 6 concentric with raised portion 4 and having an inner diameter of 60 microns to expose raised portion 4. A donor impurity substance, phosphorus in this embodiment is now prediffused through the first aperture 6 for 30 minutes at a temperature of 500° C. followed by a continued heating treatment at a temperature of 1200° C. for 2 hours in an oxygen atmosphere without supplying impurity gas so as to produce an N-type base region 7 having a thickness of 3 microns and a PN or a base-collector junction 30.

A third silicon dioxide film 8 is then formed over the surface of the diffused base region 7 and photoetched to form a second circular aperture 9 of 16 microns in diameter and concentric with the raised portion 4 in the same manner as previously described. Thereafter, an accepter impurity, boron in this case, is diffused through the second circular aperture 9 into the diffused base region 7 for 15 minutes at a temperature of 1100° C. to produce P-type emitter region 10 having a thickness of 2 microns and a PN or an emitter-base junction 31, as shown in FIG. 4.

A base electrode 13, a collector electrode 14 and an emitter electrode 15 are provided respectively on the base, collector and emitter regions 7, 12 and 10, as shown in FIG. 5. The provision of the electrodes may be made by the usual photoetching technique by masking the pertinent surface of the silicon wafer with the silicon dioxide film 16, which also serves to protect the junctions at the surface, and which is not necessary on the upper surface of the raised portion 4, since the existence of such a film over the raised portion will lower the property of transmitting the stress applied to the semiconductive material through the stress applicator 11. Also, the existence of such a film, which is an insulator, interposed between the stress applicator and the silicon wafer is undesirable in case the emitter electrode 15 is electrically connected to the emitter through the stress applicator instead of being electrically connected directly to the silicon wafer.

The stress applicator 11 to be mounted on the raised portion 4 may comprise, for instance, a thin columnar member of tungsten having a diameter of 100 microns. It may be of a harder material such as sapphire or a material softer than the silicon, such as iron or similar metal. The raised portion according to the invention corresponds to the tip of the conventional needle-like stress applicator of a hard material such as sapphire, so that a material either softer or harder than the semiconductive material may be used for the stress applicator 11 so long as its tip area is made larger than the area of the upper surface of the raised portion 4.

With a conventional needle-like stress applicator of hard material a stress applied thereto concentrates unisotropically so that a very high local strain is produced across the semiconductive material to cause deteriorating damage thereto.

According to the invention, as the tip area is larger relative to the area of the upper surface of raised portion, the stress can be uniaxially applied to a stress applicator of hard material, thereby alleviating a severe concentration of the applied stress, so that of deteriorating damage to the semiconductive material may be prevented. The severe concentration of applied stress is alleviated by virtue of the use of a stress applicator 11 in the form of a plate rather than using a conventional stress applicator having a fine tip portion which is made of a hard material.

An advantage of the present invention is that the stress applicator can be more accurately and consistently positioned with respect to the semiconductor portion of the transducer to provide substantially uniform sensitivity and quality, thereby enabling the transducer of the present invention to be more easily mass produced. In the prior art transducers, variations in the quality and characteristics of the transducer is quite common. It is extremely difficult to position the fine tip of the prior art stress applicators at a precise predetermine position on the semiconductor. It has been found that the best sensitivity is obtained when the fine tip portion of the prior art transducers is located on the exposed portion of PN junction. The farther the fine tip portion is from the junction, the lower the sensitivity becomes. Due to the small dimensions of the components of the prior art transducers, it is difficult to accurately locate the fine tip to consistently produce transducers having consistent quality and characteristics. The present invention overcomes this disadvantage since it is only necessary to apply a relatively large plate to the upper surface of the raised portion of the semiconductor wafer.

It is generally known that in the semiconductors of the present invention, the portion of the PN junction which is vertically positioned is most heavily subjected to deformation and consequently, the sensitivity of this portion of the transducer is most largely affected in use. In the present invention, the transducer has a PN junction having a longer vertical portion than those of the prior art, thus distributing the applied stresses over a larger portion of the junction to provide an improved device. Further, the vertical portion of the PN junction is located in the projecting portion of the wafer so that distortion at this portion is increased, thus further improving the sensitivity of the device.

As has been previously mentioned, the emitter electrode 15 may be electrically connected to the stress applicator 11 made of a conductive material, instead of directly connected to the silicon wafer. Although not shown in the figure, the stress applicator 11 may be provided with a stress sensitive means such as a diaphragm of a microphone or a strain responsive means of a strain gage.

The foregoing description has been concerned with a single-crystal silicon wafer of P-type conductivity. However, the invention is not restricted to silicon, and other semiconductive materials such as germanium and compound semiconductors may be used depending upon various specific purposes. Also, an N-P-N type semiconductor may be produced instead of the P-N-P type.

In the foregoing one particular fabrication process for the transistor structure has been shown as an example; a raised portion is formed on the silicon wafer, a base region is then diffused and finally an emitter region is diffused. According to this process the yield is 52% and reliable transistors having excellent characteristics are obtained.

As an alternative process the base region may first be diffused prior to the formation of the raised portion on the silicon wafer and the emitter region subsequently diffused. According to this process, the thickness of the base region in the raised portion is higher as compared to the transistor fabricated by the previous process by the height of the raised portion. Transistors made by this process exhibited an increase in the base resistance, resulting in inferior characteristics of the transducer; the yield in this case was shown to be 28%.

As another alternative process, it is conceivable to first diffuse the base region, then the emitter region, followed by the formation of the raised portion. This process is, however, not practicable in that it is accompanied by a number of difficulties in the etching process to form the raised portion after the emitter and collector regions have been formed with shallow diffusion of respective regions; the yield according to this process shown to be only 2.3% because the characteristics of a transistor are impaired by the pollution at the end of a respective junction due to the fact that the etching process is performed after the silicon dioxide film, which protects the end of the respective junction, is removed to form the raised portion.

Thus, the preferred order of steps for fabricating transistor in accordance with this invention is the formation of the raised portion followed by the diffusion of the base region and then the emitter region.

The invention is now described in conjunction with another embodiment thereof.

In the previous embodiment of the transducer shown in FIGS. 1 to 5 inclusive, the emitter and base electrodes 15 and 13 are respectively connected directly to the surface of the silicon wafer. However, this is practically very difficult since the space between the surface of the stress applicator in contact with the raised portion and the surface of the silicon wafer is extremely narrow. This difficulty may somewhat be alleviated since, as has been mentioned previously, it is possible to connect the emitter electrode 15 to the conductive stress applicator 11. Connecting the base electrode 13, however, is still difficult. The embodiment shown in FIG. 6 takes into account the above difficulties in order to facilitate the connection of the base electrode 13. The structure of FIG. 6 has a double-raised projection in which are formed both base and emitter regions; a small raised portion 4 is formed on a larger raised portion 17 formed on the silicon wafer 1. A base region 7 is formed over the entire double-raised portion and extending over the neighboring part of the silicon wafer 1. Then an emitter region 10 is formed in the base region 7 over the small raised portion and extending over the neighboring part of the upper surface of the larger raised portion 17. The portion of the silicon wafer other than the base and emitter regions 7 and constitutes the collector region 12.

The base electrode 13 is then provided on a portion of the base region 7 in the silicon wafer surface adjacent the double-raised portion, and the collector electrode 14 is provided on the collector region 12. The surface of the silicon wafer 1 is protected by growing a silicon dioxide film thereon excepting for the surfaces of the small raised portion 4 and the adjacent portion of the upper surface of the larger raised portion 17.

The stress applicator 11 is then attached on the small raised portion 4 of the transistor thus fabricated. Stress applicator 11 also functions as the emitter electrode. In order to steadily and securely mount the stress applicator 11 on the small raised portion which has a very small area, a resinous insulating setting agent 20 may be applied at and about the portions of contact between the stress applicator and the transistor.

In operation of the transducer shown in FIGS. 1 to 5, when a stressing load (grams) W is applied to the stress applicator 11, the stress concentrates on the part of the stress applicator in contact with the upper surface of the small raised portion to have a value of $(W/S_N)$, grams/cm.$^2$, where SN is the area of the semiconductor contacted by the stress applicator, which is applied across the emitter base junction to vary electrical properties of the transistor. As the major part of the emitter base junction lies in the small raised portion (which is about 10 microns in diameter), it is sufficient to assume that $S_E$ is the area of the emitter junction in the small raised portion 4, which area is about $1.6\times10^{-6}$ cm.$^2$. On the other hand, the area $S_N$ of the upper surface of the small raised portion 4 is about $10^{-6}$ cm.$^2$. By setting the areas $S_E$ and $S_N$ respectively to the above values the results of measurement of the variation of the current amplification factor $h_{FE}$ of the transistor is carried out by a conventional measuring method such as by a load scale A shown in FIG. 7. As is apparent from FIG. 7 with a load W of less than 0.3 g. the amplification factor $h_{FE}$ is substantially constant, and in the variable range when W changes by about 0.2 g. the current amplification factor undergoes a change in the order of about 40. Such a great change in the amplification factor with only a very small change of about 0.2 g. in the stressing load has never been realized with a conventional transducer of this type.

For the sake of comparison, a similar measurement of variation of the current amplification factor $h_{FE}$ made on a conventional transducer comprising a needle-like stress applicator having a tip contact area $S_N$ of about $10^{-6}$ cm.$^2$ and a planar transistor having an emitter junction area of about $1.6\times10^{-3}$ cm.$^2$ resulted in the plot of FIG. 7 with the load scale of B. This plot shows almost no variation of $h_{FE}$ with W of below 3 g. and the corresponding variation by $h_{FE}$ of about 40 with change in W by about 2 g. In FIG. 7(I) represents a unit of the current varied by the stress. The sensitivity is shown by the graph in units of (I)/(dyne/cm.$^2$). Comparison of these results demonstrate the excellent characteristics of the transducer according to the invention. This is attributable to the unique configuration of the transistor according to the invention in which it is possible to increase the ratio $S_N/S_E$ of the stress applicator contact area $S_N$ to the emitter junction area $S_E$; the value of $S_N/S_E$ according to this invention is, from the above exemplary figures, about $6\times10^{-2}$, whereas it is about $6\times10^{-4}$ in conventional transducers.

As described above, the sensitivity of the semiconductor device according to the present invention is superior to that of the prior art devices since the value of $S_N/S_E$ of the former is made larger than that of the latter. Further, the present transducer does not utilize a stress applicator having a fine tip portion, so that the transducer according to the present invention is rugged, does not suffer from deteriorating damage in the semiconductor body due to the application of large stresses during operation thereof and which is simpler to fabricate. Moreover, the present devices will have more uniform characteristics since its response is not so greatly dependent upon location of the stress applicator.

While the inveniton has been disclosed with reference to the particular structure herein shown, it is not confined to the details and arrangement set forth. This application is intended to cover such modifications or departures as may come within the spiritual scope of the invention.

What is claimed is:

1. A semiconductor transducer comprising:

a planar transistor including a semiconductor wafer having a raised portion integral with the top face thereof, said raised portion having a top surface substantially parallel to the top face of said semiconductor wafer, said transistor having a base region of a first conductivity type, an emitter region of a second conductivity type, and a collector region of said first conductivity type, on which are respectively mounted a base electrode, an emitter electrode and a collector electrode, at least a portion of said base and emitter regions extending into said raised portion;

an oxide film masking at least a portion of the top face of said semiconductor body, the surface of said raised portion being unmasked; and a stress applicator mounted on said raised portion of said transistor, the contact area of said stress applicator being larger than the area of said upper surface of said raised portion.

2. A semiconductor transducer as claimed in claim 1 wherein said base region, emitter region and collector region are formed by diffusion.

3. A semiconductor transducer as claimed in claim 1 wherein said oxide film masks at least a portion of an exposed PN junction on the top surface of said semiconductor wafer.

4. A semiconductor transducer as claimed in claim 1 wherein said base region is located above said collector region, said emitter region is located above said base region, and said stress applicator is located above said emitter region.

5. A semiconductor transducer as claimed in claim 1 wherein said base and emitter regions form a PN junction extending substantially vertically into said raised portion.

6. A semiconductor transducer as claimed in claim 1 wherein said stress applicator is made of an electroconductive material.

7. A semiconductor transducer as claimed in claim 1 wherein said emitter electrode is mounted on the unraised top face of the semiconductor body where the emitter region is located.

8. A semiconductive transducer comprising a transistor having a double-raised portion formed on one side of a planar semiconductive material of one conductivity type, said double-raised portion having an upper surface parallel to the surface of the unraised portion of said semiconductive material, said transistor including an emitter region formed in the upper raised portion of said double-raised portion, a base region contiguous with said emitter region and extending over said double-raised portion and adjacent part of the surface of the unraised portion of said semiconductive material, a collector region contiguous with said base region, and a base electrode provided at a part of said base region in the surface of the unraised portion adjacent said double-raised portion, and a stress applicator having a tip contact area larger than said upper surface of said double-raised portion, and an insulating resin filled in the space between said stress applicator and said transistor.

9. A semiconductive transducer as claimed in claim 8, wherein the side of said semiconductive material containing said emitter and base regions is masked with an oxide film except for the surfaces of the raised portion.

References Cited

UNITED STATES PATENTS

| | | | |
|---|---|---|---|
| 3,278,696 | 10/1966 | Mason | 179—110 |
| 3,290,539 | 12/1966 | Lamorte | 313—114 |
| 3,312,881 | 4/1967 | Yu | 317—235 |
| 3,323,358 | 6/1967 | Fraioli | 73—141 |

JERRY D. CRAIG, Primary Examiner